US011598408B2

(12) United States Patent
Dalum et al.

(10) Patent No.: US 11,598,408 B2
(45) Date of Patent: Mar. 7, 2023

(54) PTO LUBRICATION SYSTEM FOR HYBRID VEHICLES

(71) Applicant: Power Technology Holdings LLC, Pewaukee, WI (US)

(72) Inventors: Joseph T. Dalum, Pewaukee, WI (US); William C. Mammen, Jr., Oconomowoc, WI (US); Aaron Scott Kim Vanselow, Brookfield, WI (US)

(73) Assignee: Power Technology Holdings LLC, Pewaukee, WI (US)

( * ) Notice: Subject to any disclaimer, the term of this patent is extended or adjusted under 35 U.S.C. 154(b) by 132 days.

(21) Appl. No.: 17/027,648

(22) Filed: Sep. 21, 2020

(65) Prior Publication Data

US 2021/0108716 A1 Apr. 15, 2021

Related U.S. Application Data

(63) Continuation of application No. 16/053,772, filed on Aug. 2, 2018, now Pat. No. 10,781,910.

(Continued)

(51) Int. Cl.

*F16H 57/04* (2010.01)
*B60K 25/06* (2006.01)

(Continued)

(52) U.S. Cl.

CPC ........... *F16H 57/0445* (2013.01); *B60K 6/40* (2013.01); *B60K 17/28* (2013.01); *B60K 25/06* (2013.01);

(Continued)

(58) Field of Classification Search

CPC ............. F16H 57/0445; F16H 57/0412; F16H 57/0435; F01M 1/02; F16N 7/00;

(Continued)

(56) References Cited

U.S. PATENT DOCUMENTS 3,493,066 A 2/1970 Dooley
4,676,116 A 6/1987 Nerstad et al.

(Continued)

FOREIGN PATENT DOCUMENTS

DE 27 01 301 7/1978
DE 40 24 384 A1 2/1992

(Continued)

OTHER PUBLICATIONS

Non-Final Office Action regarding U.S. Appl. No. 15/588,532, dated Feb. 25, 2021, 19 pps.

(Continued)

*Primary Examiner* — Muhammad Shafi
(74) *Attorney, Agent, or Firm* — Foley & Lardner LLP

(57) ABSTRACT

A vehicle drive system includes a first prime mover, a transmission, a power take-off (PTO), a lubrication system for the transmission and the PTO, and a control system. The transmission is powered by the first prime mover. The transmission is configured to rotate a drive shaft of the vehicle. The PTO is connected to the transmission at a first interface. The PTO includes the first interface and a second interface. The control system is configured to control fluid flow through the lubrication system for at least one mode where the input section of the PTO is stationary and the output section rotates.

20 Claims, 8 Drawing Sheets

Related U.S. Application Data

(60) Provisional application No. 62/541,055, filed on Aug. 3, 2017, provisional application No. 62/714,006, filed on Aug. 2, 2018.

(51) Int. Cl.

| | |
|---|---|
| ***B60K 17/28*** | (2006.01) |
| ***B60K 6/40*** | (2007.10) |
| ***F16N 29/00*** | (2006.01) |
| ***F16N 7/00*** | (2006.01) |
| ***F01M 1/02*** | (2006.01) |

(52) U.S. Cl.

CPC ........... *F01M 1/02* (2013.01); *F16H 57/0412* (2013.01); *F16H 57/0435* (2013.01); *F16N 7/00* (2013.01); *F16N 29/00* (2013.01); *B60Y 2200/92* (2013.01); *F16N 2210/04* (2013.01); *F16N 2210/12* (2013.01); *F16N 2230/02* (2013.01); *F16N 2270/00* (2013.01)

(58) Field of Classification Search

CPC .. F16N 29/00; F16N 2210/04; F16N 2210/12; F16N 2230/02; F16N 2270/00; B60K 6/40; B60K 17/28; B60K 25/06; B60K 2025/005; B60K 2006/4816; B60K 25/00; B60K 6/48; B60Y 2200/92

USPC ............................................................ 701/36

See application file for complete search history.

(56) References Cited

U.S. PATENT DOCUMENTS

| | | | | |
|---|---|---|---|---|
| 5,669,842 | A | 9/1997 | Schmidt | |
| 6,251,042 | B1 * | 6/2001 | Peterson .............. | B60H 1/3222 477/3 |
| 7,146,960 | B2 | 12/2006 | Phlips et al. | |
| 7,343,897 | B2 | 3/2008 | Katrak et al. | |
| 7,600,595 | B2 | 10/2009 | Harris | |
| 7,641,018 | B2 | 1/2010 | Bissontz | |
| 7,669,414 | B2 | 3/2010 | Loeffler | |
| 7,892,080 | B1 | 2/2011 | Dahl | |
| 7,921,950 | B2 | 4/2011 | Harris | |
| 8,115,450 | B2 | 2/2012 | Ambrosio et al. | |
| 8,118,005 | B2 | 2/2012 | Bradley et al. | |
| 8,408,341 | B2 | 4/2013 | Dalum et al. | |
| 8,608,607 | B2 | 12/2013 | Kandeth | |
| 8,672,066 | B2 | 3/2014 | Momal | |
| 8,818,588 | B2 | 8/2014 | Ambrosio et al. | |
| 8,978,798 | B2 | 3/2015 | Dalum et al. | |
| 9,315,187 | B2 | 4/2016 | Stenson | |
| 9,751,518 | B2 | 9/2017 | Dalum et al. | |
| 9,875,440 | B1 | 1/2018 | Commons | |
| 2002/0167221 | A1 | 11/2002 | Kosik et al. | |
| 2003/0054919 | A1 | 3/2003 | Matsubara et al. | |
| 2003/0149676 | A1 | 8/2003 | Kasabov | |
| 2004/0168449 | A1 | 9/2004 | Homan et al. | |
| 2006/0032684 | A1 | 2/2006 | Rayl | |
| 2006/0102137 | A1 | 5/2006 | Phlips et al. | |
| 2007/0181355 | A1 | 8/2007 | Harris | |
| 2008/0234097 | A1 | 9/2008 | Sah | |
| 2008/0243324 | A1 | 10/2008 | Harris | |
| 2009/0018716 | A1 | 1/2009 | Ambrosio | |
| 2009/0068547 | A1 | 3/2009 | Ambrosio et al. | |
| 2009/0095549 | A1 | 4/2009 | Dalum et al. | |
| 2009/0096424 | A1 | 4/2009 | Ambrosio et al. | |
| 2009/0266068 | A1 | 10/2009 | Long | |
| 2010/0006356 | A1 * | 1/2010 | Curry ..................... | G06Q 40/12 320/155 |
| 2010/0018505 | A1 | 1/2010 | Ma et al. | |
| 2010/0057281 | A1 | 3/2010 | Lawyer et al. | |
| 2010/0065358 | A1 | 3/2010 | Harris | |
| 2010/0130327 | A1 | 5/2010 | Morgan, Jr. | |
| 2010/0219007 | A1 * | 9/2010 | Dalum ..................... | B60K 6/48 180/65.21 |
| 2011/0172890 | A1 | 7/2011 | Ulrey et al. | |
| 2011/0174578 | A1 * | 7/2011 | Richard ................. | B60K 17/28 184/35 |
| 2011/0306455 | A1 | 12/2011 | Kandeth | |
| 2012/0207620 | A1 | 8/2012 | Dalum et al. | |
| 2014/0081895 | A1 | 3/2014 | Coenen et al. | |
| 2014/0256505 | A1 | 9/2014 | Dalum et al. | |
| 2015/0100530 | A1 | 4/2015 | Mnih et al. | |
| 2015/0204758 | A1 * | 7/2015 | Schnell .................. | G06Q 10/20 73/114.37 |
| 2015/0360675 | A1 | 12/2015 | Nefcy et al. | |
| 2016/0238127 | A1 | 8/2016 | Nedorezov et al. | |
| 2017/0278018 | A1 | 9/2017 | Mnih et al. | |
| 2017/0355373 | A1 * | 12/2017 | Dalum ................ | F16H 61/0031 |
| 2018/0157973 | A1 | 6/2018 | El-Yaniv et al. | |
| 2019/0014488 | A1 | 1/2019 | Tan et al. | |
| 2019/0143957 | A1 | 5/2019 | Dalum et al. | |

FOREIGN PATENT DOCUMENTS

| | | | |
|---|---|---|---|
| DE | 41 02 822 | | 8/1992 |
| DE | 41 02 882 | A1 | 8/1992 |
| DE | 42 04 384 | A | 8/1993 |
| DE | 19748423 | | 2/1999 |
| DE | 19748423.3 | | 2/1999 |
| DE | 10203514 | | 8/2003 |
| DE | 10203514.4 | | 8/2003 |
| DE | 10 2007 016 514 | A1 | 10/2008 |
| JP | 08-308020 | | 11/1996 |
| JP | 08-322107 | A | 12/1996 |
| JP | 09-163616 | | 6/1997 |
| JP | 10-037904 | | 2/1998 |
| JP | H10-037904 | | 2/1998 |
| JP | H11-069509 | A | 3/1999 |
| JP | H11-115743 | A | 4/1999 |
| JP | 2000-115912 | | 4/2000 |
| JP | 2000-156917 | A | 6/2000 |
| JP | 2000-170888 | | 6/2000 |
| JP | 2000-287307 | A | 10/2000 |
| JP | 2001-008309 | | 1/2001 |
| JP | 2001-112117 | A | 4/2001 |
| JP | 2001-254643 | | 9/2001 |
| JP | 2002-046507 | A | 2/2002 |
| JP | 2002-171601 | A | 6/2002 |
| JP | 2003-191762 | A | 7/2003 |
| JP | 2003-232412 | A | 8/2003 |
| JP | 2004-006136 | A | 1/2004 |
| JP | 2004-100504 | A | 4/2004 |
| JP | 2004-166363 | A | 6/2004 |
| JP | 2004-254402 | A | 9/2004 |
| JP | 2005-005438 | A | 1/2005 |
| JP | 2005-102492 | A | 4/2005 |
| JP | 2005-351381 | A | 12/2005 |
| JP | 2007-062640 | A | 3/2007 |
| JP | 2007-068358 | A | 3/2007 |
| JP | 2007-069788 | | 3/2007 |
| JP | 2007-089262 | A | 4/2007 |
| JP | 2007-106385 | | 4/2007 |
| JP | 2007-107231 | | 4/2007 |
| JP | 2007-177694 | A | 7/2007 |
| JP | 2009-292287 | A | 12/2009 |
| JP | 2011-501714 | A | 1/2011 |
| JP | 2011-525448 | A | 9/2011 |

OTHER PUBLICATIONS

Non-Final Office Action on U.S. Appl. No. 14/283,185 dated Jun. 28, 2019.

Office Action regarding EP Application No. 12853908.7 dated May 9, 2019, 4 pps.

Notice of Allowance on U.S. Appl. No. 15/883,067 dated May 9, 2019.

Non-Final Office Action on U.S. Appl. No. 15/588,532 dated Nov. 21, 2019.

(56) References Cited

OTHER PUBLICATIONS

International Search Report and Written Opinion regarding Int'l. Appl. No. PCT/US2021/063367, dated Apr. 18, 2022, 12 pps.

* cited by examiner

PTO LUBRICATION SYSTEM FOR HYBRID VEHICLES

CROSS-REFERENCES TO RELATED APPLICATIONS

This application is a continuation of U.S. application Ser. No. 16/053,772 filed Aug. 2, 2018, which claims the benefit of and priority to U.S. Application No. 62/541,055 filed on Aug. 3, 2017 and to U.S. Application No. 62/714,006 filed on Aug. 2, 2018, which are incorporated herein by reference in their entireties. The present application is related to U.S. Pat. No. 8,905,166, which claims the benefit of priority to and which is a divisional of U.S. Pat. No. 8,408,341, which:

- is a continuation-in-part of U.S. Pat. No. 8,978,798, which claims the benefit of priority to U.S. Provisional Application No. 60/979,755, filed Oct. 12, 2007, and U.S. Provisional Application No. 61/014,406, filed Dec. 17, 2007;
- is a continuation-in-part of U.S. Pat. No. 8,818,588, which claims the benefit of priority to U.S. Provisional Application No. 60/959,181, filed Jul. 12, 2007, and U.S. Provisional Application No. 61/126,118, filed May 1, 2008;
- is a continuation-in-part of PCT/US2009/066151, filed Nov. 30, 2009, which claims the benefit of priority to U.S. Provisional Application No. 61/177,240, filed May 11, 2009, U.S. Provisional Application No. 61/118,980, filed Dec. 1, 2008, U.S. Provisional Application No. 61/235,998, filed Aug. 21, 2009, and U.S. Provisional Application No. 61/251,285, filed Oct. 13, 2009;
- is a continuation-in-part of PCT/US2008/008442, filed Jul. 10, 2008;
- is a continuation-in-part of PCT/US2008/079376, filed Oct. 9, 2008, which is a continuation of U.S. Pat. No. 8,978,798, which claims the benefit of priority to U.S. Provisional Application No. 60/979,755, filed on Oct. 12, 2007, and U.S. Provisional Application No. 61/014,406, filed on Dec. 17, 2007.

The present application is also related to U.S. application Ser. No. 14/640,818 filed on Mar. 6, 2015, which is a continuation of U.S. application Ser. No. 13/397,561 filed on Feb. 15, 2012, which is a continuation-in-part of U.S. Pat. No. 8,978,798, which claims the benefit of priority to U.S. Provisional Application Ser. No. 60/979,755 filed Oct. 12, 2007, and U.S. Provisional Application Ser. No. 61/014,406 filed Dec. 17, 2007, and which is also a continuation-in-part of U.S. Pat. No. 8,818,588, which claims the benefit of priority to U.S. Provisional Application Ser. No. 60/959,181 filed Jul. 12, 2007 and U.S. Provisional Application Ser. No. 61/126,118, filed May 1, 2008, each of the above references is incorporated herein by reference in its entirety.

BACKGROUND

The present application relates to vehicle drive systems. More particularly, the present disclosure relates to hybrid and non-hybrid vehicle drive systems that utilize a power take off.

Hybrid electric vehicles (HEVs) include non-plug in hybrid electric vehicles and plug-in hybrid electric vehicles (PHEVs) that utilize rechargeable batteries that can be recharged by plugging into an external source of HEVs). The HEVs are powered by an internal combustion engine or other propulsion source that can run on conventional or alternative fuel in combination with an electric motor that uses energy stored in a battery. HEVs combine the benefits of high fuel economy and low tail pipe emissions with the power and range of conventional vehicles. Some HEVs use electronic or electric power take off (PTO) features where the PTO is powered by an electric motor using energy stored in the battery or other source to reduce emissions and provide quieter operations.

SUMMARY

Some embodiments relate to a vehicle drive system for a vehicle. The vehicle drive system includes a first prime mover, a transmission, a power take-off (PTO), a lubrication system for the transmission and the PTO, and a control system. The transmission is powered by the first prime mover. The transmission is configured to rotate a drive shaft of the vehicle. The PTO is connected to the transmission at a first interface. The PTO includes the first interface and a second interface. The control system is configured to control fluid flow through the lubrication system for at least one mode where the input section of the PTO is stationary and the output section rotates.

Some embodiments relate to a lubrication system for a hybrid vehicle. The lubrication system includes a transmission fluid reservoir, a lubrication circuit coupled to the transmission fluid reservoir, a power take-off (PTO), a lubrication circuit, and a control system. The transmission fluid reservoir is associated with a transmission powered by a first prime mover of the vehicle. The PTO is connected to the transmission at a first section, wherein the vehicle is capable of operating in at least one mode where at least a portion of the PTO rotates while lubrication of the PTO is not supplied by the rotation of the transmission. The control system is configured to generate a control signal defining a path for lubricant flowing through the PTO when in the E-PTO mode.

Some embodiments relate to a method of lubricating and cooling a power take-off (PTO) of an engine. The method includes: determining a lubricating and cooling condition of the PTO and determining whether to activate a prime mover connected to the input section or directing lubricant into the PTO according to the lubricating and cooling condition. The lubricating and cooling condition of the PTO is determined when an input section of the PTO is stationary and an output section of the PTO rotates.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
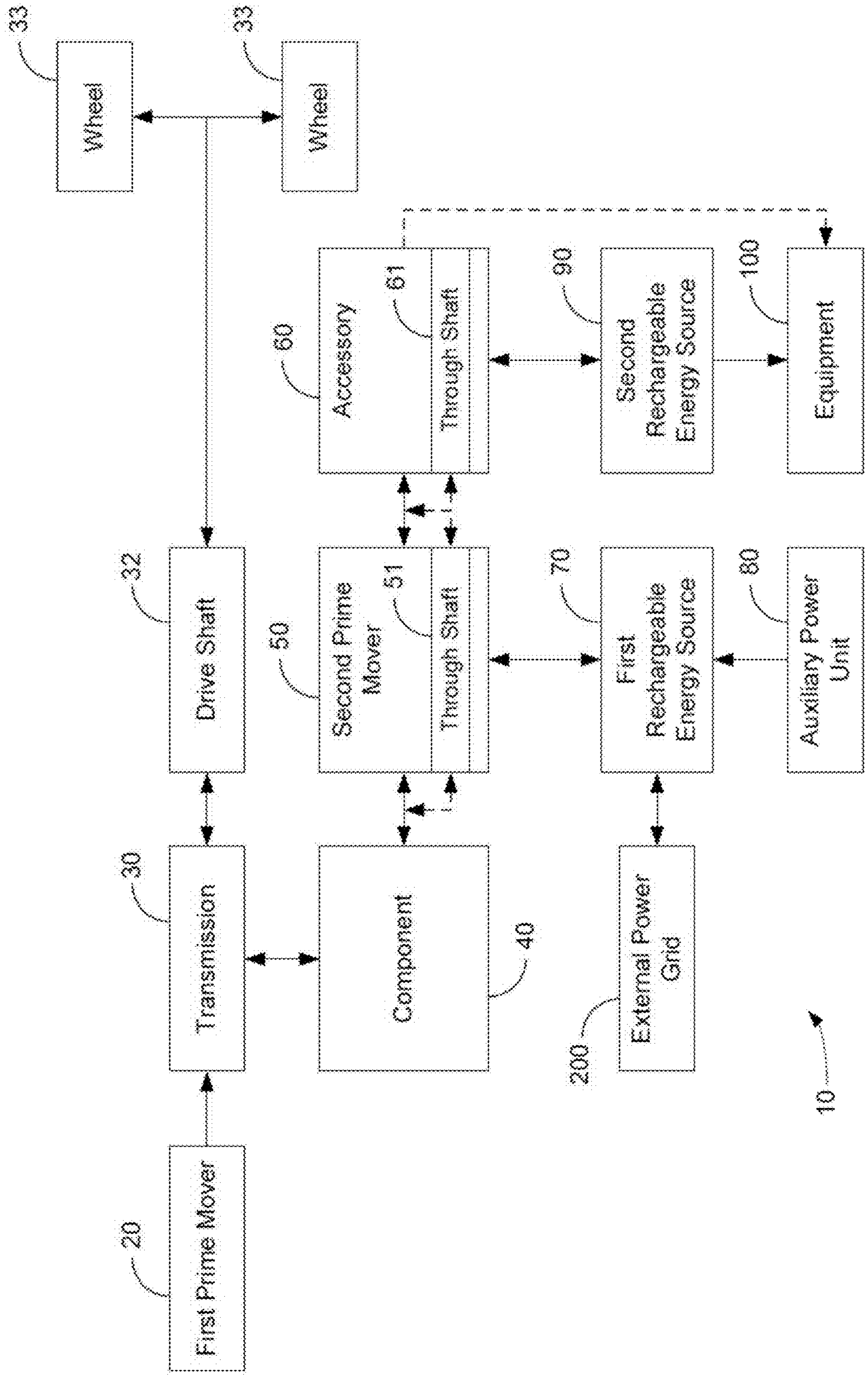
FIG. 1 is a general schematic block diagram of an exemplary embodiment of a hybrid vehicle drive system.

In certain modes of HEV and ePTO operation, the PTO may not receive sufficient lubrication, thereby causing excessive wear or component failure. Referring generally to the figures, systems and methods of cooling and/or lubricating a PTO in an ePTO mode or HEV application when the transmission fluid pump is stationary are shown according to various exemplary embodiments. With reference to FIG. 1, an exemplary embodiment of a hybrid vehicle drive system 10 can be employed on any type of vehicle. According to some embodiments, the vehicle can be any type of light, medium, or heavy duty truck. In some embodiments, the vehicle is a truck that employs hydraulic or electronic accessories and systems including but not limited to: a boom truck, digger derrick truck, garbage truck, a, tow truck, a refrigeration truck, or a street sweeper. Alternatively, the vehicle can be any type of platform where hybrid systems or e-PTO systems are employed. The vehicle may have a wide variety of axle configurations including, but not limited to a 4×2, 4×4, or 6×6 configuration.

The hybrid vehicle drive system 10 includes a first prime mover 20 (e.g., an internal combustion engine, such as a diesel fueled engine, etc.), a first prime mover driven transmission 30, a component 40 (e.g., a power take-off (PTO), a transfer case, etc.), a second prime mover 50 (e.g., a motor, such as an electric motor/generator, a hydraulic pump with a thru-shaft, etc.), and an accessory 60 (e.g., a hydraulic pump, such as a variable volume displacement pump, etc.). In certain embodiments, accessory 60 can act as a third prime mover as described below. Transmission 30 is mechanically coupled to component 40. Component 40 is coupled to second prime mover 50. Second prime mover 50 is coupled to accessory 60. Second prime mover 50 may be further used to power various on-board components such as compressors, water pumps, cement mixer drums, etc. In some embodiments, the hybrid vehicle drive system 10 is a system as disclosed in U.S. Pat. No. 8,978,798, incorporated herein by reference in its entirety, and modified to provide cooling and/or lubricating of the component 40 (e.g., a PTO) as described herein. In some embodiments, the system 10 may only be utilized when the vehicle is stationary. When the vehicle is stationary, the system 10 may power accessory 60 electrically, such a system may be referred to as an ePTO, or electrical power take-off. In some embodiments, the hybrid vehicle drive system 10 is not a hybrid system and the component 40 (e.g., the PTO) may only transfer power out of the transmission 30 (or other attachment point for a PTO). The power out of the transmission 30 may occur both during driving and stationary vehicle operations, or may only occur when the vehicle is stationary.

In some embodiments, the accessory 60 is embodied as a hydraulic motor and includes a through shaft coupled to the component 40 embodied as a PTO. The through shaft is also coupled to the shaft of the mover 50 embodied as an electric motor. In another embodiment, the electric motor includes the through shaft that is coupled to the PTO and the pump. In some embodiments, the transmission 30 and the second prime mover 50 are couple together using a split shaft PTO arrangement such as the arrangement disclosed in U.S. Pat. No. 9,878,616, incorporated herein by reference in its entirety. In some embodiments, component 40 may be directly or indirectly coupled to an accessory 60 and accessory may be coupled to second prime mover 50. As an example, a PTO may be coupled directly or by use of a shaft to a hydraulic pump. The hydraulic pump may have a through-shaft providing a mechanical connection between the PTO and an electric motor or can be end shaft mounted to the PTO or the electric motor. The electric motor may be directly coupled to the hydraulic pump, or connected to the hydraulic pump using a shaft. In some embodiments, the accessory 60 is a hydraulic pump for feeding street sweeping components of the vehicle.

According to some embodiments, system 10 also includes a first rechargeable energy source 70 (e.g., a battery, a bank of batteries, a fuel cell, a capacitive cell, or other energy storage device), an Auxiliary Power Unit (APU) 80 (e.g., an internal combustion engine, possibly fueled by an alternative low emission fuel (e.g., bio-mass, natural gas, hydrogen, or some other fuel with low emissions and low carbon output), and a generator, a fuel cell, etc.), a second rechargeable energy source 90 (e.g. a hydraulic accumulator, ultra capacitor, etc.), and onboard or external equipment 100 (e.g., hydraulically operated equipment, such as an aerial bucket, etc.). First rechargeable energy source 70 is coupled to second prime mover 50 and provides power for the operation of second prime mover 50. First rechargeable (e.g., pressurized or rechargeable) energy source 70 may include other auxiliary components (e.g., an inverter provided for an AC motor, a DC-to-DC converter to charge a DC system, an inverter for power exportation to a power grid or other equipment, controllers for motors, a charger, etc.). APU 80 is coupled to first rechargeable energy source 70 and provides power to first rechargeable energy source 70. According to one exemplary embodiment, second renewable energy source 90 is a hydraulic system with a high pressure portion (e.g., an accumulator) and a low pressure component (e.g., a reservoir tank).

Second rechargeable energy source 90 is coupled to accessory 60 and provides stored power for accessory 60. Onboard or external equipment 100 can be coupled to accessory 60 or second rechargeable energy source 90 and operate using power from either accessory 60 or second rechargeable energy source 90. In some embodiments, onboard or external equipment 100 is coupled through second rechargeable energy source 90 to accessory 60. According to various exemplary embodiments, APU 80 may also provide power to both second renewable energy source 90 and first rechargeable energy source 70 when high hydraulic loads are required. APU 80 and second renewable energy source 90 may both provide power to hydraulically operated equipment 100.

In some embodiments, the component 40 is a PTO designed to engage or disengage while the transmission is moving via a clutch mechanism. The PTO can be a street side or curb side PTO or located in a different position, such as near the top of the transmission 30, or a location at a desired angle to the transmission (e.g., at one or two o'clock direction), etc. The component 40 can be disengaged from the transmission 30 when the first prime mover 20 exceeds the maximum operating RPM of any component connected through component 40. For example, component 40 can be disengaged if first prime mover 20 exceeds the maximum operating RPM of accessory 60. Alternatively, all components connected through component 40 can operate throughout the RPM range of first prime mover 20, and component 40 can be engaged continuously. In some embodiments, the component 40 can be disengaged during high speed steady driving conditions to reduce friction and wear on system 10.

Alternatively, the transmission 30 may be modified to incorporate component 40 and optionally incorporate second prime mover 50 directly into transmission 30. Component 40, embodied as a PTO, may optionally include a PTO shaft extension. An example of a PTO shaft extension is described in U.S. Pat. Nos. 6,263,749 and 6,499,548 both of which are incorporated herein by reference. Component 40 can have a direct connection to transmission 30.

The component 40 may interface with transmission 30 in a way that there is a direct coupling between mover 20, component 40, and transmission 30. Alternatively, component 40 may interface with transmission 30 in a way that the interface directly couples component 40 to the torque converter of transmission 30. The torque converter may be in mechanical communication with mover 20, but rotating at a different speed or may rotate at the same speed as mover 20 if it is locked up.

A clutch mechanism can be employed to properly engage and disengage component 40. In some embodiments, the component 40 is a PTO that has an internal clutch pack, such as a hot shift PTO. A hot shift PTO can be used when frequent engagements of the PTO are required, often with automatic transmissions. In some embodiments, the second prime mover 50 can be operated at the same RPM as first prime mover 20 prior to the engagement of component 40. This is intended to reduce wear on the clutch mechanism if component 40 has a 1:1 ratio of input speed to output speed. If other ratios for component 40 are used, the RPM of first prime mover 20 or second prime mover 50 can be adjusted accordingly prior to engagement to insure that input and output speed match the ratio of the component to reduce wear on the clutch mechanism. While the component 40 is engaged, the second prime mover 50 can operate to provide power to a drive shaft 32 via transmission 30.

In some embodiments, the first prime mover 20 provides power to drive shaft 32 through transmission 30. Second prime mover 50 provides additional or alternative power to drive shaft 32 through component 40 and transmission 30. Drive shaft 32 provides power to two or more wheels 33 used to provide forward and backward momentum to the vehicle. For example, second prime mover 50 can optionally provide the sole source of power to drive shaft 32. Alternatively, second prime mover 50 can provide additional power to drive shaft 32 during vehicle acceleration. When providing power to drive shaft 32, second prime mover 50 can operate using power from first rechargeable energy source 70. According to the various exemplary embodiments of system 10, first rechargeable energy source 70 can be charged or powered by second prime mover 50, APU 80 or another suitable source (e.g., the vehicle alternator, the power grid, etc.).

Figure 2A:
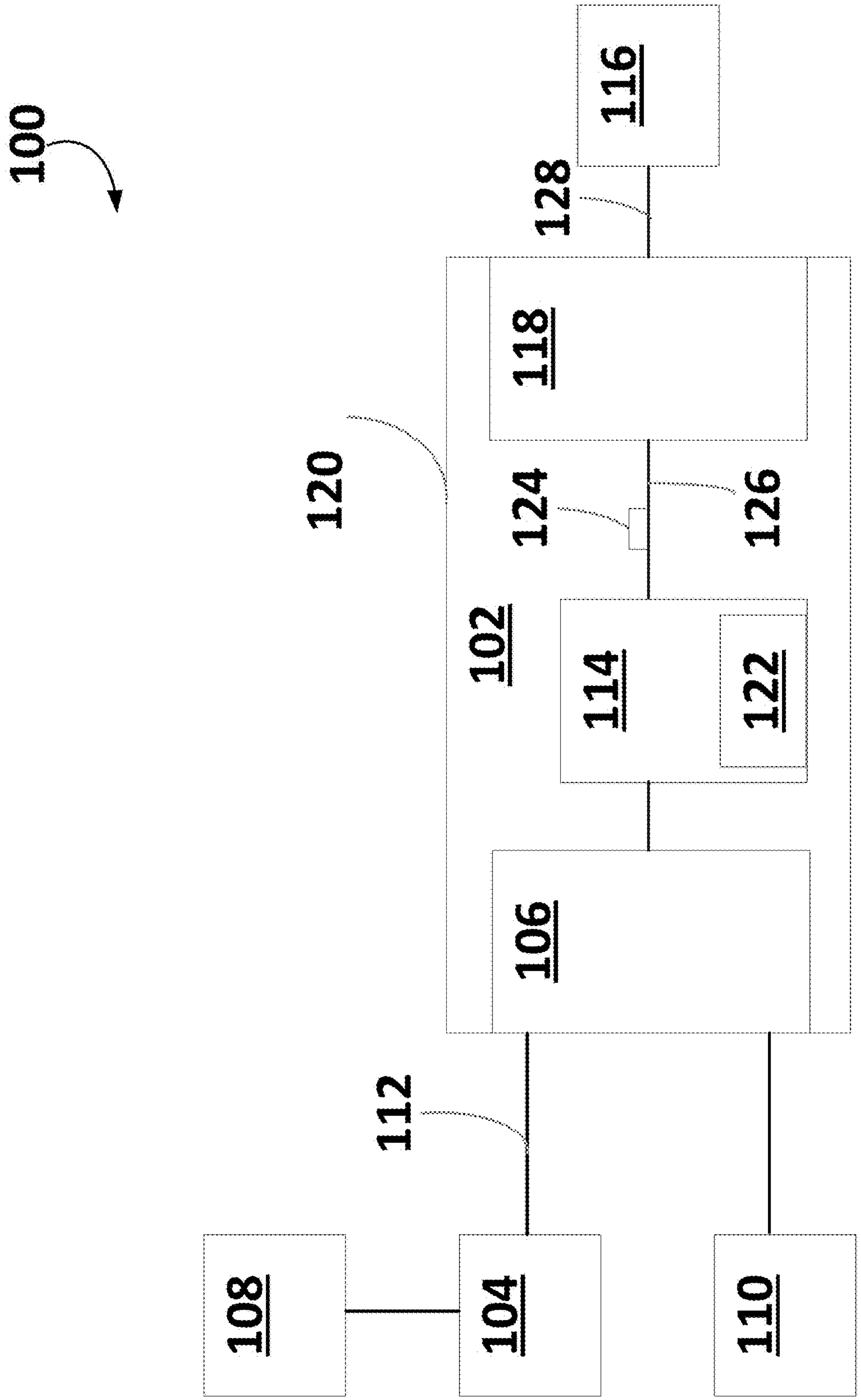
FIG. 2A is a general schematic block diagram of a PTO coupled to components of the hybrid vehicle drive system illustrated in FIG. 1.

With reference to FIG. 2A, a PTO 102 (e.g., the component 40 in FIG. 1) is mounted directly to the transmission 30 or is mounted to the drive shaft 32 according to some embodiments. The PTO 102 is embodied as a split shaft PTO and is attached to a side of the transmission 30 in some embodiments. The PTO 102 is mounted to a prop shaft 112, which is a shaft output of the transmission 30, located between the transmission 30 and the axle (not shown) or to the prime move 20 according to some embodiments. The PTO 102 includes a housing or enclosure 120 according to some embodiments. The PTO 102 includes at least a first interface 106 between the PTO 102 and a source of power (e.g., the engine or prime move 20, the electric motor or prime move 50, the transmission 30, the prop shaft 112, or other shaft). In some embodiments, the PTO 102 receives power through the first interface 106. In some embodiments, the PTO 102 transfers power through the first interface 106. The PTO 102 also includes at least a second interface 118 between the PTO 102 and a device or accessory 60. The transmission 30 is coupled to the prime mover 50 and/or the accessory 60 via the first and second interface 106 and 118 in some embodiments. In some embodiments, the PTO 102 can be mounted to a through shaft at the interface 118 which is connected to the prime mover 50 and the accessory 60 in some embodiments. The PTO 102 provides a device to transfer power to the device or accessory 60 according to some embodiments. In some embodiments, the PTO 102 transfers power to the device or accessory 60 through the second interface 118 or receives power from the second interface 118.

In some embodiments, the first interface 106 includes a gear (not shown), a coupler (not shown), or other means to transfer power to the PTO 102. In some embodiments, power flows bi-directionally so that power can also flow from the PTO 102 to a device that would normally provide power. For example, power may transfer from the PTO 102 to the transmission 30, the prop shaft 112, or the prime mover 20 according to some embodiments.

In some embodiments, the second interface 118 includes a joint (not shown), a coupler (not shown), a shaft (not shown) or other means to transfer power to the device or accessory 60, or any other objects that requires power. In some embodiments, within the housing or enclosure 120 of the PTO 102, gears 114 rotate to transfer power between the first interface 106 and the second interface 118. In some embodiments, the gears 114 change the speed of rotation or direction of rotation of the first interface 106 relative to the second interface 118. In some embodiments, the gears 114 may be supported by bearings (not shown) or any other suitable means that allow for rotation and support of the gears 114 as they rotate relative to the fixed PTO housing 120. As the gears 114 rotate, there is a third interface 122 between the gear 114 and the system of support for the gear 114 (e.g., the bearings) according to some embodiments. In order to reduce resistance to rotation of the gear 114 and extend the longevity of the third interface with gear 114, lubrication of the third interface 122 and/or the first and the second interfaces 106 and 118 is provided according to some embodiments.

In some embodiments, a fluid lubricant may be used for the lubrication of the first interface 106, the second interface 118, and/or the third interface 122. In some embodiments, the fluid lubricant is contained within the PTO 102. In some embodiments, the fluid lubricant may be provided by a reservoir (not shown) or any suitable sources outside of the housing of the PTO 102, such that the fluid lubricant may need to be directed into the interior of the housing 120 where the bearings are located. In some embodiments, the fluid lubricant may be directed to the PTO 102 by means of splash or spray. For example, when the PTO 102 is affixed to the transmission 30, the PTO 102 may receive splash and spray of transmission fluid from the transmission 30 according to some embodiments. In some embodiments, the splash or spray may be caused by movement of gears or other moving parts within the transmission 30, since the transmission 30 may have its own reservoir of fluid lubricant (e.g., transmission fluid). In some embodiments, a channel, a hose or other line to transfer fluid from a reservoir exterior to the PTO 102 may be used. For example, in some embodiments, the hose may be affixed to an output port of the transmission 30, which allow fluid to flow into the hose and be directed to a port on the housing 120 of the PTO 102.

In some embodiments, the PTO 102 includes a clutch 124 within the PTO 102 that can connect or disconnect the first interface 106 and/or the second interface 118. For example, the clutch 124 is located within the PTO housing 120 in between the second interface 118 and the gears 114 according to some embodiments. In some embodiments, the clutch 124 may be activated by a variety of means, such as a cable, pneumatic pressure or hydraulic pressure, etc. In some embodiments, the clutch 124 may also be surrounded by the fluid lubricant. In some embodiments, hydraulic pressure may be generated by a transmission fluid pump (not shown) within the transmission 30. In some embodiments, the hydraulic pressure may be generated by other devices such as an electric pump (not shown).

In some embodiments, the operation of the device or accessory 60 powered by the PTO 102 is powered by the second prime mover 50 or the vehicle is propelled by the second prime mover 50 through the PTO 102 to reduce the need for power from the prime move 20, reduce noise from the prime mover 20, reduce fuel consumption, or for other reasons, such as rapid adjustment of speed (e.g., the ability to turn on and off the device or accessory 60 more quickly than typically provided by the input to the PTO 102). In some embodiments, electrifying the operation of the PTO 102 may result in the first interface 106 (or portions thereof) being stationary or disconnected. In some embodiments, a shaft 126 supported by the second interface 118 or in mechanical communication with the second interface 118 may rotate due to rotational power from the electric motor or prime mover 50 coupled to the shaft 126 (e.g., coupled directly to the prime mover 50 or through rotation of gears 114 connected to the shaft 126). In some embodiments, the ability to keep the first interface 106 (or portions thereof) stationary while the second interface 118 rotates is accomplished by opening or disconnecting the clutch 124 that is located within the housing 120 of the PTO 102. In some embodiments, the electric motor or prime mover 50 may be internal to the PTO housing 120, or may be external to the PTO housing 120. In some embodiments, the rotation of the shaft 126 may cause parts of the clutch 124 within the PTO 102 to rotate and may cause wear and tear in the bearing and area of support for the shaft 126.

In some embodiments, the shaft 126 may be connected to a coupler or joint (not shown) that rotates. In some embodiments, the shaft 128 may include a universal joint (cardan joint) or a constant-velocity joint that facilitates the operation of the device or accessory 60 without having to have the device or accessory 60 be directly mounted in line with the output of the PTO 102. In some embodiments, the shaft 126 is a PTO extension shaft. In some embodiments, the PTO 102 itself may be built with a shaft integrated as part of the PTO 102. In some embodiments, the design with the shaft internal to the PTO 102 also requires lubrication to prevent excessive wear and tear on moving parts and reduce potentially damaging heat from friction. If the rotational portion of the second interface 118 is not lubricated, heat may build up due to excessive friction. Thus, systems and methods of cooling and lubricating the PTO 102 are advantageously provided both during driving and stationary operation of the vehicle drive system 10.

In some embodiments, in the case of an e-PTO mode where the prime mover 50 or other power source rotates a shaft connected to the PTO 102 with the prime move 20 off, cooling of the PTO 102 is performed. In some embodiments, lubricating the PTO 102 is also performed. For example, during electric power take-off (ePTO) mode or modes of operation in which a shaft rotates that is connected to one end of the second interface 118 of the PTO 102, while the other end (e.g., the end connected to the first interface 106) of the PTO 102 is stationary, heat can be generated within the PTO 102. In some embodiments, the PTO 102 requires additional lubrication in many applications of the PTO 102 within the vehicle drive system 10. In some embodiments, the PTO 102 requires additional lubrication especially if lubricant that is directed to a portion of the PTO 102 that rotates is further from the source of spray from a moving transmission 30 (e.g., when the transmission 30 is rotating), or if the fluid lubricant stops or slows in flow to parts of the PTO 102 requiring lubrication. In some embodiments, the reduced flow of fluid lubricant or lack of fluid lubricant may be caused when the transmission 30 or other devices coupled to the PTO 102, such as the prime mover 20, is stationary and not moving. In some embodiments, the prime mover 20 may be stationary and not moving when the device or accessory 60 connected to the PTO 102 is electrified, yet a shaft 128 between the device or accessory 60 and the PTO 102 continues to rotate. In some embodiments, the lack of lubrication can be a problem that is exhibited in ePTO operation but not in operation of the PTO 102 that involves movement of the first interface 106. In some embodiments, this can be due to the lack of movement of the transmission 30 or other power source connected to the first interface 106 that helps to facilitate lubrication of the PTO 102 and the second interface 118.

Figure 2B:
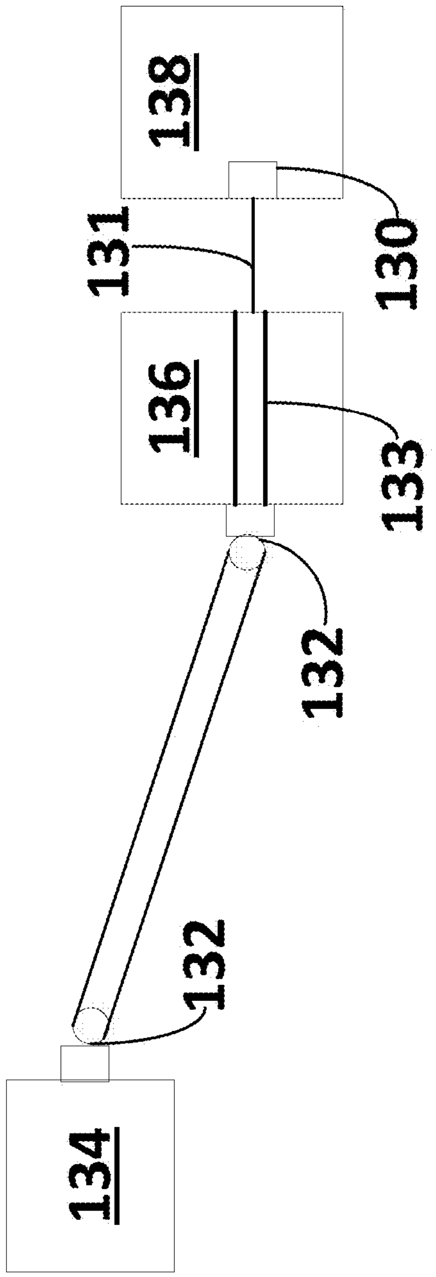
FIG. 2B is a general schematic block diagram of a PTO coupled to components of the hybrid vehicle system illustrated in FIG. 1.

With reference to FIG. 2B, a general schematic block diagram of a PTO 134 coupled to components of the hybrid vehicle system illustrated in FIG. 1 is depicted according to some embodiments. In some embodiments, the PTO 134 is similar as the PTO 102 of FIG. 2A. In some embodiments, the PTO 134 is connected to an electric motor 136 through a joint means 132 according to some embodiments. In some embodiments, the joint means 132 can include any suitable jointing mechanism and components, such as a U-joint, a CV-joint, etc. In some embodiments, the PTO 134 includes a clutch that is embedded within the PTO housing of the PTO 134. In some embodiments, the clutch is engaged to connect the PTO 134 to the joint means 132. In some embodiments, the electric motor 136 includes a through shaft 133. In some embodiments, the PTO 134 is connected to an accessory 138 (e.g., a hydraulic pump) through the through shaft 133 of the electric motor 136. In some embodiments, the electric motor 136 is connected to a shaft 130 within the accessory 138 via a coupler 131. In some embodiments, the electric motor 136 is similar to the second prime mover 50 of FIG. 1, and the accessory 138 is similar to the accessory 60 of FIG. 1.

Figure 2C:
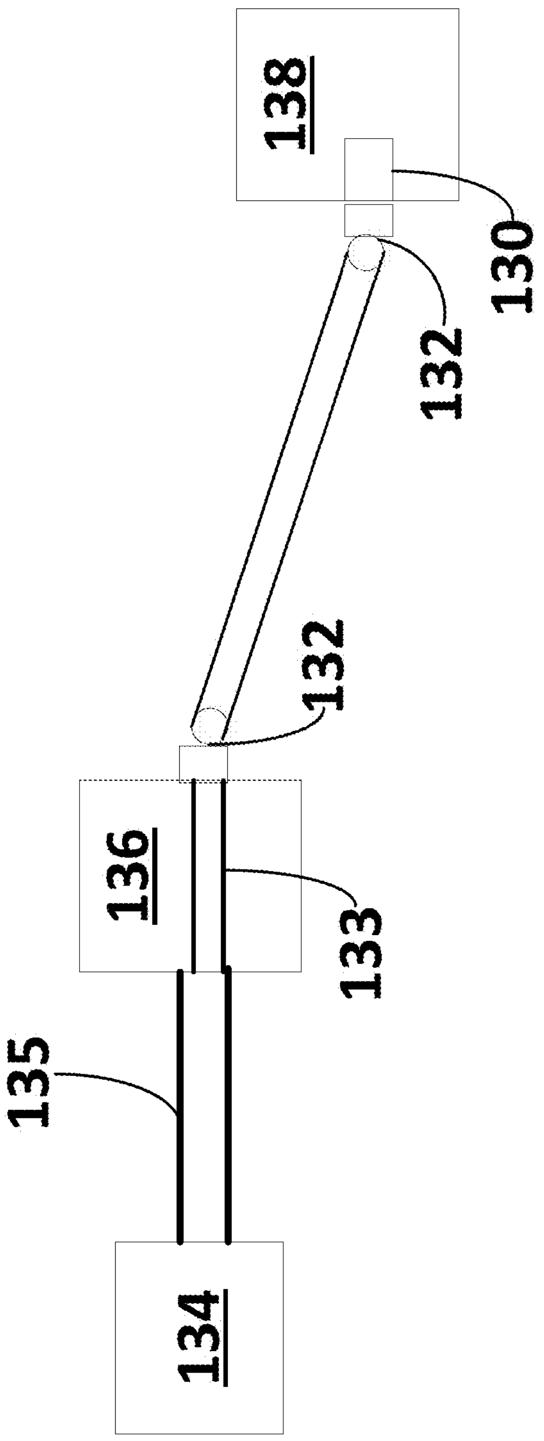
FIG. 2C is a general schematic block diagram of a PTO coupled to components of the hybrid vehicle system illustrated in FIG. 1.

With reference to FIG. 2C, a general schematic block diagram of the PTO 134 coupled to components of the hybrid vehicle system 10 illustrated in FIG. 1 or an ePTO system is depicted according to some embodiments. The PTO 134 is connected to the electric motor 136 through a shaft extension 135 which is supported by the transmission 30 according to some embodiments. In some embodiments, the connection between the shaft extension 135 and the electric motor 136 includes a fastener system (e.g., a bolt fastener). In some embodiments, the shaft extension 135 is connected to the through shaft 133. In some embodiments, the electric motor 136 is connected to the accessory 138 through the joint means 132.

Figure 2D:
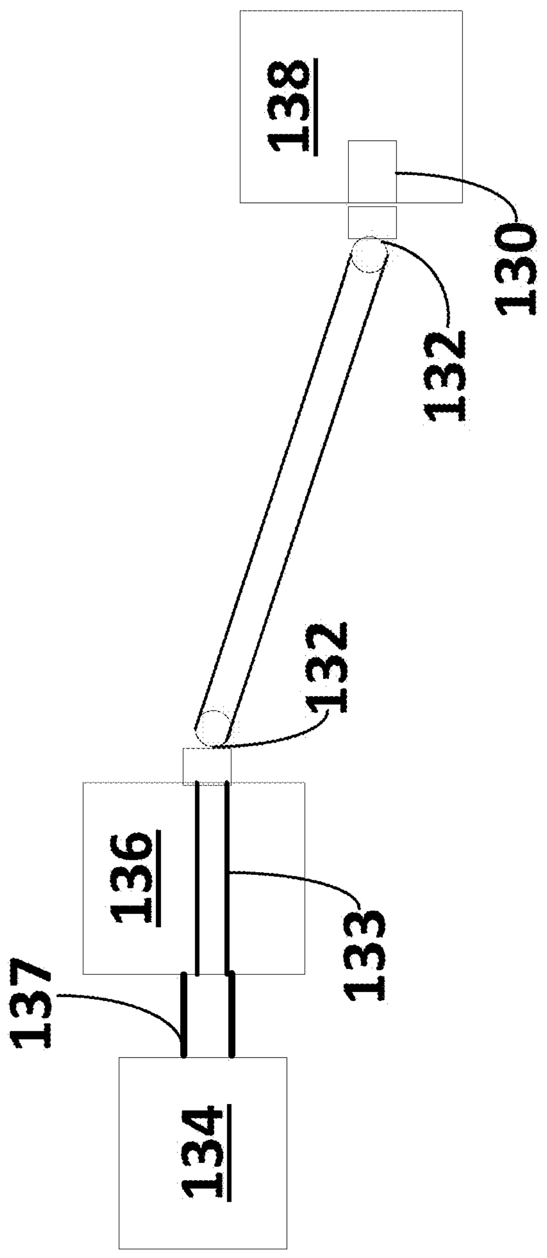
FIG. 2D is a general schematic block diagram of a PTO coupled to components of the hybrid vehicle system illustrated in FIG. 1.

With reference to FIG. 2D, the PTO 134 includes a shaft within the PTO 134. In some embodiments, the PTO 134 is connected to the electric motor 136 via a clutch 137. In some embodiments, the clutch 137 is external to the PTO and the electric motor 136 (e.g., the prime mover 50). In some embodiments, when the clutch 137 is engaged, the PTO 134 is connected to the electric motor 136. In some embodiments, the electric motor 136 includes the through shaft 133 and is connected to the accessory 138 via the joint 132.

Figure 2E:
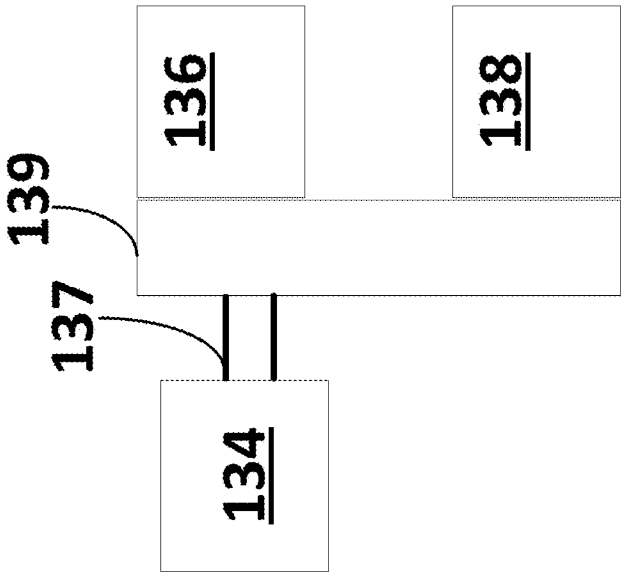
FIG. 2E is a general schematic block diagram of a PTO coupled to components of the hybrid vehicle system illustrated in FIG. 1.

With reference to FIG. 2E, the PTO 134 is connected to both the electric motor 136 (the prime mover 50) and the accessory 138 (the accessory 60) through gears 139. In some embodiments, the gears 139 includes a split shaft for transferring rotation from the PTO 134 to both the electric motor 136 and the accessory 138. In some embodiments, the electric motor 136 and the accessory 138 has different rotation speeds (e.g., the electric motor 136 has a higher speed than the accessory 138). In some embodiments, the PTO 134 is connected to the gears 139 via the clutch 137. In some embodiments, a location of the electric motor connected to the gears 139 can be changed depending upon the structure of the gears 139.

Figure 2F:
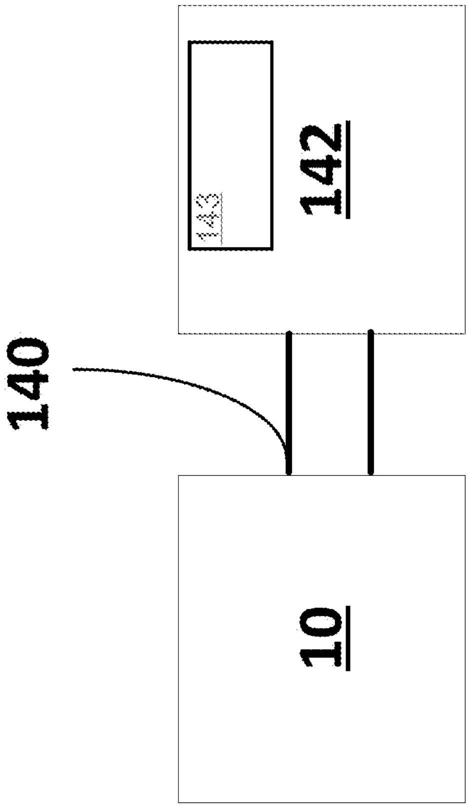
FIG. 2F is a general schematic block diagram of an application of the hybrid vehicle system 10 in FIG. 1.

With respect to FIG. 2F, a general schematic block diagram of an application of the hybrid vehicle system 10 in FIG. 1 or an ePTO system is depicted according to some embodiments. In some embodiments, the hybrid vehicle system 10 is connected to the accessory 142 (accessory 60) via the gears 140 or an extended shaft. In some embodiments, the accessory 142 is a compressor and/or fan for a refrigeration unit. In some embodiments, the hybrid vehicle system 10 directly drives the compressor and/or fan of the refrigeration unit. In some embodiments, the accessory 142 is powered by a battery (first rechargeable energy source 70) of the hybrid vehicle system 10. In some embodiments, the gears 140 include a belt mechanism, which enables the compressor to spin faster than output of the electric motor of the hybrid vehicle system 10. In some embodiments, the accessory 142 is further connected to an evaporator that is located in a trailer or a unit on straight truck. In some embodiments, the accessory 142 includes an inverter 143 which converts the DC power from the rechargeable energy source 70 to 120 VAC power or a grid power format so that the accessory 142 can be designed for use on grid power and yet be powered by the rechargeable energy source 70. In some embodiments, the inverter 143 provides other power levels and types appropriate for the compressor and/or fan motors. In such embodiments, the gears 140 or other belt mechanism is optional. An umbilical power conductor can be provided between the hybrid drive system 10 in a tractor and the accessory 142 in the trailer to provide power to the accessory 142 in some embodiments. In some embodiments, an optional battery system is provided on the trailer and receives power from the prime mover 50.

Figure 3:
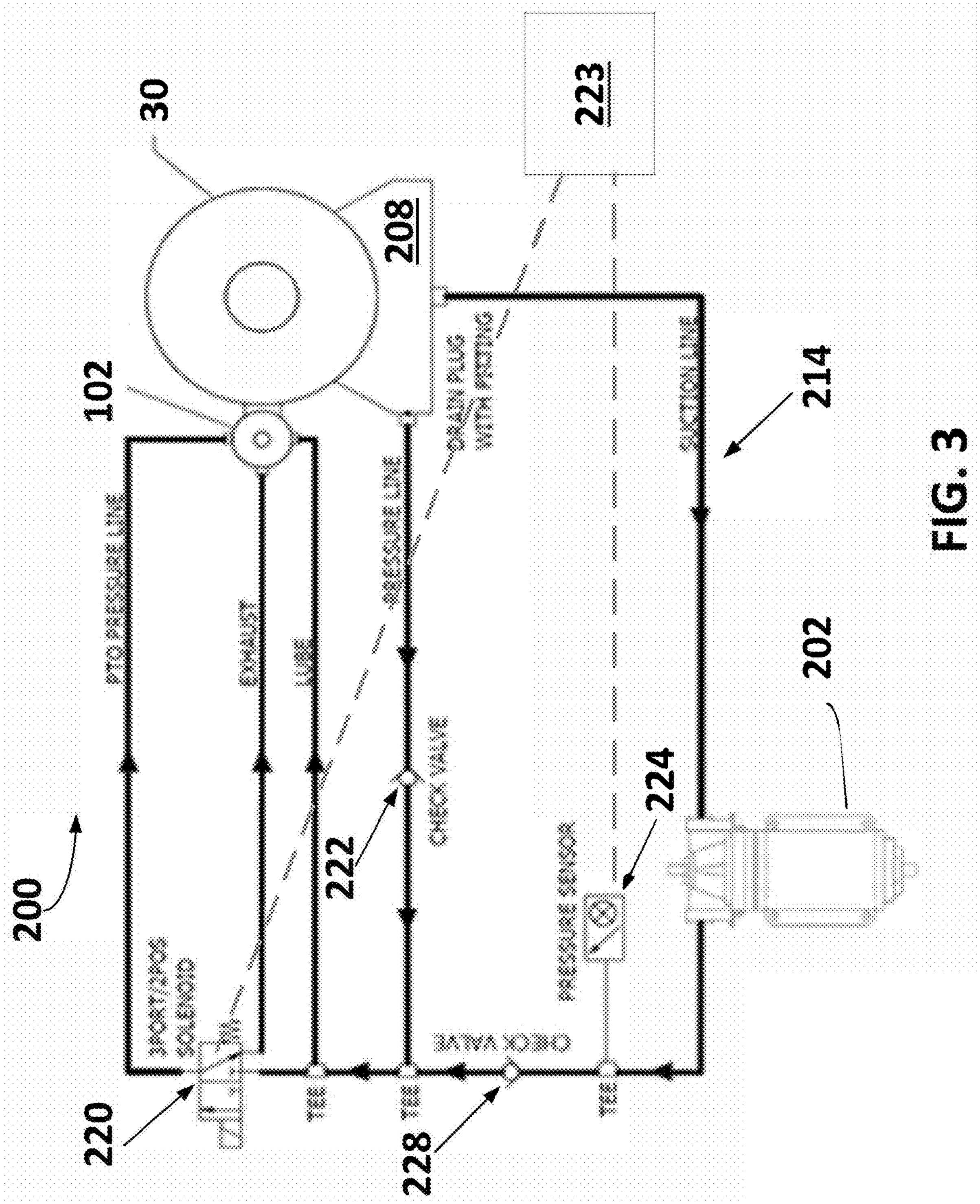
FIG. 3 is a general schematic block diagram of a system of cooling and lubricating the PTO of FIG. 1.

With reference to FIG. 3, a system 200 for cooling and lubricating the PTO 102 includes a pump 202, a lubrication circuit 214, a valve 220, a valve 222, a control circuit 223, a pressure sensor 224, and a valve 228. The valves 222 and 228 are one way check valves in some embodiments. A suction line of the lubrication circuit 214 is coupled between an output of the pump 202 and a drain plug in communication with a lubricant or transmission fluid reservoir 208 of the transmission 30. The pressure line is coupled to the check valve 222 and a pressure line output of the transmission 30. A lube line is coupled to a port on the PTO 102 and the check valve 222. The system 200 is retrofitted to existing PTO/transmission arrangements in some embodiments The valve 220 is a three port, two position solenoid valve controlled by the control circuit 223 to choose selectable paths in the lubrication circuit 214. According to one path, an exhaust line which is coupled to a port on the PTO 102 is coupled to the PTO pressure line coupled to another port of the PTO 102 for a non-ePTO mode in some embodiments. According to another path, the PTO pressure line is coupled to the check valve 228 which is coupled to the pump 202 for an ePTO mode in some embodiments.

The pump 202 is an electrically powered pump or a pump powered by other electrically driven equipment such as the accessory 60, the prime mover 50 or other device. The control circuit 223 is a processor, computer, or other electronic device that provides a control signal in response to an ePTO mode or a measured pressure or temperature that causes lubricant to be provided to the PTO 102. The control signal causes operation of the pump 202 and selection of the path through the PTO pressure line in some embodiments.

During non-hybrid or non-ePTO operation, the PTO 102 is both lubricated and cooled by the movement of fluid into the PTO 102 caused by operation of the transmission 30, the prime mover 20, or other device that provides power to the PTO 102 according to some embodiments. The transmission 30 when transferring power from a prime mover (e.g., the prime move 20) to the PTO 102, uses the gears 114 that are lubricated using transmission fluid or other fluid having a lubricating property according to some embodiments. The fluid lubricant, such as transmission oil, can be stored and drawn from the reservoir 208 past moving components within the transmission 30 and the PTO 102 and then through an optional transmission oil cooler (not shown) according to some embodiments. A pump within or integrated with the transmission 30 and driven by the rotation of the transmission 30 by the prime move 20 circulates the transmission fluid to the moving parts of the transmission 30, such as clutches internal or external to the transmission 30 according to some embodiments. The lubricant travels through the lubrication circuit 214 from the pressure line to the lube line as controlled by the valve 220 (the exhaust line is coupled to the PTO pressure line and the PTO pressure line is not coupled to the pump 202 which is off) in some embodiments. Other techniques for lubricating the PTO 102 and transmission 30 can be used, such as immersion in the fluid lubricant, and splash or spray of the fluid lubricant within the PTO 102 as previously described according to some embodiments.

In some embodiments, a PTO or gear box in direct or indirect mechanical communication with the PTO 102, and attached to a prime mover (e.g., the prime move 20 or prime mover 50), the transmission 30 or a drive-shaft (not shown) has a sealed housing 102 (FIG. 2) in which the fluid lubricant is contained within the housing 120. In some embodiments, the movement of the mechanism in mechanical communication with the first interface 106 of the PTO 102 helps to move the fluid lubricant. This occurs because the fluid lubricant, such as transmission fluid, resides in the transmission 30 or gearbox, and movement of gears and fluid pumps internal to the transmission 30 or gearbox can cause fluid to splash, be pumped, or put into contact with the PTO 102 according to some embodiments. In some embodiments, lubrication of the PTO 102 is needed because when the PTO 102 rotates, gears (e.g., the gears 114), bearings, seals and other mechanical interfaces (e.g., the first, second, and third interfaces 106, 118, and 122) of moving components internal to the PTO 102 need to be lubricated. In some embodiments, lack of lubrication may cause excessive friction within the PTO 102 and/or may cause excessive friction at the first interface 106 of the PTO 102 with the transmission 30 or the second interface 118 of the PTO 102 with the shaft 128 or other component in mechanical communication with the output of the PTO 102. Excessive friction can shorten the life of the PTO 102 or components interfaced with the PTO 102 due to excessive wear, excessive heat, or excessive resistance to motion of rotating input and output portions of the PTO 102. In some embodiments, the lack of lubrication or pressure within the PTO 102 may cause optional clutches embedded within the PTO housing 120 to seize or stop easily moving when the clutch would have normally been open (disconnected). The inability to open the clutch can be particularly detrimental if the PTO 102 is utilized in an ePTO application.

When the prime mover 20, the transmission 30 or drive shaft 32 is not moving or not moving at sufficient speed, lubrication may decrease or stop within the PTO 102. If both the interfaces 106 and 118 of the PTO 102 are stationary, heat will generally not be generated due to friction of moving components since there is no movement. In an ePTO application, the input section or interface 106 or portions thereof of the PTO 102 may be stationary while the output section or interface 118 may rotate. When the interface 118 rotates, potentially due to a shaft or other component being rotated by the second prime mover 50 or other source of rotational power, it is advantageous to have low resistance at the interface of the rotating shaft or component and the stationary portions of the PTO 102. A lack or lubrication can cause excessive resistance for the rotation of the normally freely rotating (or relatively easily rotated with low resistance) shaft 126 or component coupled to the interface 118 of the PTO 102. This can cause a malfunction of the ePTO system or malfunction of equipment interfaced to the PTO 102. In some embodiments, the PTO 102 is modified by removing an internal drag brake. The drag brake is often intended to stop movement of the PTO output once the PTO is disengaged. In an ePTO application, it may be advantageous to disable the drag brake by removing drag brake components or making other modifications so that a shaft between the PTO and the second prime mover can rotate with little resistance when the PTO is disconnected from the transmission 30 or first prime mover 20.

During ePTO or hybrid PTO operation, the typical input component (first prime mover 20, transmission 30, or the drive shaft 32 driving the shaft 112) may be stationary and/or off. The electric motor or prime mover 50, the hydraulic motor or accessory 60 or other source may rotate one or more shafts connected to the interface 118 of the PTO 102. If the transmission 30 is stationary during such operation, the conventional transmission cooling system does not operate and moving components within the PTO 102 or coupled to the PTO 102, that are being actuated or rotated by the second prime mover 50 or other device generate a substantial amount of heat. Advantageously, the system 200 removes the generated heat and provides lubrication while the interface 106 (or portions thereof) to the PTO 102 is stationary in some embodiments.

The lubrication pump 202 is used to provide lubrication when the interface 106 to the PTO 102 is stationary (e.g., when in an EPTO mode) in some embodiments. The lubrication pump 202 is affixed to a support structure of the transmission 30 that is mounted in close proximity to a transmission fluid reservoir 208 (e.g., the sump of the transmission 30). The pump 202 draws the transmission fluid from the transmission fluid reservoir 208 or similar reservoir and transports that fluid to the PTO 102 to both lubricate the moving parts and also transport heat from the moving parts to the bulk of the transmission fluid which acts as a large heat sink.

In some embodiments, an external pump is used to move other lubricating fluids, such as lubricating oil or fluid within the prime mover 20, a gear box or contained PTO mechanism, such as Rear Engine Power Take-Off (REPTO) or other device having lubrication internal to the mechanism. The external pump increases lubrication for devices that are not affixed to the transmission fluid reservoir 208. In some embodiments, a separate pump, external or internal to a powertrain, may be operated to circulate fluid for a REPTO or other device such as gear box. The pump may use an electrical source of power to enable operation of the pump (e.g., may be driven by the prime mover 50) when the engine (first prime mover), transmission, driveshaft or other mechanical input is stationary. This configuration is advantageous when one part of PTO 102 rotates (the interface 118) due an external source of power while other parts of the PTO 102 remain stationary.

In some embodiments, the system 200 advantageously monitors the lubricating fluid flow for proper volume and/or rate. In some embodiments, the system 200 advantageously detects absence of the flow of the lubrication to protect components associated with the PTO 102 and components coupled to the PTO 102. The system 200 advantageously detects a fault in the lubrication operation so that damaging high heat or excessive wear is avoided in the event of a failure in the lubrication system. The fault is detected by monitoring pressure levels as measured by the pressure sensor 224 or by monitoring temperature levels as measured by temperature sensors. Pressure levels below a threshold, temperature levels above a threshold or both are indications of a fault. The control circuit 223 can turn on the pump 202 and select the PTO pressure line in response to the fault in some embodiments.

In order to effectively lubricate the PTO 102 and transport heat to the transmission fluid in the reservoir 208, the system 200 utilizes the pressure sensor 224 and/or temperature sensors to monitor the current state of the PTO 102 according to some embodiments. The monitored system pressures and/or temperatures, enable efficient operation of the ePTO mode and also preventing redundant operation of both a conventional and hybrid transmission oil cooling systems according to some embodiments.

In some embodiments, it may not be immediately apparent that the PTO 102 is lubricated when the PTO operates in ePTO mode because transmission fluid may be contained within the housing 120 of the PTO 102 according to some embodiments. In some embodiments, the PTO 102 is mounted in a location that allows it to receive spray of transmission fluid during driving, and then retain some of the transmission fluid within the PTO 102 during an ePTO operation. In addition, because of the importance of lubricating the PTO 102 in ePTO mode to avoid potentially hazardous heat buildup, it is advantageous to monitor an operation of the lubrication circuit 214. If the lubrication circuit 214 fails, the PTO 120 may heat up, damaging the PTO 102, the optional clutch 124 within the PTO and causing potentially overheating of the enclosure 120 according to some embodiments. In order to most effectively and least invasively monitor and control the application of fluid, components of the electrical system of the vehicle are utilized according to some embodiments. In some embodiments, the vehicles pressure or temperature sensor(s) are used. In some embodiments, the electrical system could use another sensor (not shown) during the time that the conventional (non-hybrid or non-ePTO) system is inactive. Other methods of monitoring and controlling lubrication by the system 200 include the use of the transmission's internal temperature sensors and/or temperature sensors mounted to the PTO directly either mechanically or by adhesive could be used according to some embodiments.

Heat can build up to such an extent that the PTO housing 120 may be too warm to touch according to some embodiments. If a failure to circulate lubricating and heat removing fluid is detected, then one of several system operations may be performed to reduce the temperature according to some embodiments. One system operation (e.g., initiated by the control circuit 223) is to stop the prime mover 50 coupled to the PTO 102, or coupled to a shaft that is connected to the PTO 102 according to some embodiments. Stopping the prime mover 50 stops rotation of an accessory (not shown) coupled to the prime mover 50, which could be undesirable according to some embodiments. Another system operation (e.g., initiated by the control circuit 223) is starting the prime mover 20, which further rotates the transmission 30 that rotates a transmission fluid pump (not shown) according to some embodiments. The rotation of the transmission fluid pump (either through the prime mover 50, or through a mechanical connection that derives power from the prime mover 20) may cause fluid to move within the transmission 30 according to some embodiments.

The movement of gears within the transmission 30 can also cause movement of transmission fluid within the transmission 30 according to some embodiments. In some embodiments, the movement of transmission fluid may cause splashing of such fluid to reach the PTO 102 that is affixed or attached to the transmission. The method of fault handling in which the engine is started is advantageous because the PTO 102 may continue to operate and be lubricated, while continuing to rotate the prime mover 50 and the accessory 60 or allow operation of the accessory 60 without the operation of the prime mover 50, such as if a gear box or split-shaft PTO device were attached to the PTO that is affixed to the transmission 30. When the prime mover 20 is started, the path of the lubrication circuit 214 is chosen for non-PTO mode of operation in some embodiments.

In some embodiments, the temperature near the bearing of the PTO 102 is monitored as the bearing may not receive sufficient lubrication due to slow movement or stationary positioning of the input section of the PTO 102. Monitoring the bearing can be performed by a temperature sensor on the case of the PTO 102 or near the PTO/transmission interface. The temperature input or other device for determining a condition with damaging higher friction may be used as an input to a control circuit 223. The control circuit 223 may activate certain functions to reduce friction and heat. As an example, if heat in the PTO 102 increases above a certain threshold, the prime mover 50 and/or transmission 30 is rotated to increase flow of lubricating fluid to the PTO 102 (as an example, either by starting the engine or rotating the prime mover with another source of power, such as an electrical motor). Alternatively, the pump 202 may be turned on to circulate fluid based upon the temperature input signal or other input indicating high friction or heat.

The situation in which one part of the PTO 102 rotates while the input section is stationary may occur if an external source of power rotates the output of the PTO 102 while the input is slow or stationary, or the device connected to the input (engine, transmission, drive shaft or other input) is slow or stationary. In some embodiments, a separate pump or the pump 202 directs the fluid to the part of the PTO 102 that is experiencing higher friction via a port on or in the PTO itself 102. In some embodiments, a condition that could require an action to be taken to increase lubrication to a PTO 102 is sensed by infrared (measuring heat), acoustic (detecting or measuring certain sounds potentially caused when the bearings become too hot), or other techniques. Alternatively the system 200 (e.g., the control circuit 223) measures the time that the shaft into the PTO 102 has turned without the transmission 30 being rotated. The rotational speed, RPM, of the shaft that rotates and is coupled to the PTO 102, along with optionally the external temperature, may also be used to indicate if a condition requiring lubrication is likely to be present. Using such inputs, the control circuit 223 calculates when the system 200 should turn on the engine for better lubrication to the PTO 102 or turn on a pump periodically.

The present application introduces a vehicle drive system that uses an all-electric mode to rotate a prime mover (e.g., engine) according to an example embodiment. In some embodiments, while the vehicle drive system is under the all-electric mode, the prime mover is driven by electrical power from electric motors, so that no fuel is needed for driving the prime mover. In some embodiments, the electrical power from the electric motors is also applied to one or more power take-offs (PTOs) to assist in propulsion. In some embodiments, the electrically rotated prime mover proves power for accessories attached to the prime mover and a transmission pump, which is coupled to a crankshaft. In some embodiments, the electrical power applied to the PTOs provides the ability to provide sufficient power to propel the vehicle. In some embodiments, a rear engine power take-off (REPTO) is used to provide power to the prime mover using an electric motor. The vehicle drive system can use the architectures or principles discussed in the applications listed in the cross reference to the related applications.

The present application introduces a unique minimally intrusive system that complements the existing powertrain according to an example embodiment. New powertrains with a single large electric motor can be expensive because there is not much supply for large electric motors (example, larger than 180 kW). A plug-in hybrid has advantages because while batteries of 180 kWh to 450 kWh that are sufficient for all-electric propulsion are becoming commercially available, they are still big and expensive, and recharging them quickly introduces infrastructure challenges. The lower range of the large batteries typically requires high power "opportunity charging" through the day in different locations when used on an all-electric bus to complete an entire day, which increases infrastructure costs. The long range of the large sized batteries for buses and other large vehicles poses similar challenges when multiple vehicles are stored in one location and need be charged over a limited period, when the vehicles are not in use.

In some cases the electrical grid infrastructure needs to be changed so as to deliver the same amount of power that would be required by thousands of houses. It would be beneficial to have a PHEV, where there is sufficient all-electric operation for an urban area, such as a zero emissions zone in a city of perhaps 25 to 50 miles, yet where there is the capability to turn on the engine outside of the zone or on the freeway so that infrastructure charging issues are much more limited. A PHEV commercial truck or bus, may require 50 kWh to 120 kWh (approximate range of battery size), so that over a 5 to 8 hour period perhaps only 10 kW to 20 kW of charging is required, significantly below that required to recharge a 350 kWh battery in 8 hours. A minimally intrusive design is also desirable so that the base powertrain components (time proven, robust) are preserved and used if the newer technology (electric battery and electric motor) were to fail.

In some embodiments, the vehicle drive system rotates a prime mover using an electric motor, in which the electric motor is coupled to a crank shaft of the prime mover. In some embodiments, the electric motor is coupled to the crankshaft through various components, such as a REPTO, a larger starter motor capable of continuous operation, etc. In some embodiments, the prime mover driven accessories are largely coupled to the prime mover while the prime mover is driven by the electric motor, which allows those accessories to be powered without significant modifications to interfaces with the prime mover and with interfaces and power sources for the accessories. The prime mover rotated along with attached accessories provides for retrofit of a hybrid or all electric drive system with least effort, allows for backup power if batteries fail.

In some embodiments, independent smaller electric motors are used to power independent accessories. For example, a separate electric motor may power an air pump (pressurizes tank of air for brakes and other air operated features, which may include a kneeling bus relying upon air to raise and lower a corner of a bus where a door is located, or air for control of equipment on a vehicle) and steering pump.

In some embodiments, the one or more electric motors (additional prime movers) are disposed in locations similar to a PTO that is coupled to a pump section of a torque converter on an automatic transmission. In this case, the PTO is also known as "live PTO" because it is coupled to the crankshaft. In some embodiments, the one or more electric motors are disposed in locations similar to a PTO that is coupled to a gear section of an automatic transmission. In some embodiments, a motor may also be located on the drive shaft behind the transmission, and the transmission may be placed into neutral, or the clutch opened between the prime mover and the transmission, allowing the "post transmission" electric motor to provide power to the wheels. It is advantageous to use the post transmission electric motor for providing power to the wheels and rotating the crankshaft to power accessories. In some embodiments, another location for the motor or motors that powers the prime mover may be an axle mounted location, or hub motors. In some embodiments, using two or more electric motors to rotate parts of the powertrain provides multiple advantages, such as smaller design, lower cost, more easily packaged electric motors can be used, lower operating voltage (e.g., perhaps operating at 300 Volts, a voltage level typical for light duty applications). The advantage of lower operating voltage expands supply chain availability and optionally allows a modular approach where two or more battery chargers could be used to attain fast charging without having to use a single very expensive low volume component.

In some embodiments, the one or more electric motors includes a first electric motor, a second electric motor, and a third electric motor. In some embodiments, the first electric motor is configured to rotate the first prime mover electrically by using a rear engine power take-off, where part of power is used to rotate the engine, part of the power is used to power/rotate accessories (e.g., power steering pump, oil pump, air system, etc.) still connected to the engine, and the remaining power is transmitted through the crank shaft to an Allison 1000/2000/3000/4000 series automatic transmission. The power that goes to the transmission is used to rotate the torque converter pump section and transmission pump. In some embodiments, when the transmission (e.g., Allison 1000/2000 series automatic transmission) has a torque converter, there is some multiplication of torque from the torque input provided by the crankshaft.

In some embodiments, the second electric motor is coupled to a second PTO that is coupled to the transmission. In some embodiments, a transmission (e.g., the Allison 1000/2000 series transmission) uses a PTO gear that is connected to the output of the torque converter (e.g., turbine section) and provides torque directly into the gear set. The second electric motor provides power for the vehicle to move and accelerate. In some embodiments, the second electric motor is used as an ePTO. In some embodiments, when the first electric motor fails during operation, the engine may be started with a starter motor or keep the torque converter locked, which would help to continue rotating the engine provided that the vehicle was in motion. In some embodiments, if the first electric motor failed, the vehicle may switch into neutral and lock the torque converter to crank the engine with the second electric motor until it started.

In some embodiments, the third electric motor is coupled to a third PTO that is coupled to the transmission, 180 degrees opposite to the second PTO that is coupled to second electric motor. In some embodiments, when the transmission (e.g., Allison 1000/2000/3000/4000 series transmission) is available with two transmission mounted PTOs (2 PTO inputs), the third PTO is bolted to the transmission, and attaching the third electric motor to the third PTO. The benefit is that using two transmission mounted PTOs helps remove some of the asymmetrical torque into the transmission PTO gear that happens if only one PTO is used, and allows for overall greater power and torque to be delivered to the powertrain in some embodiments. The PTO may be the limiting factor for transmitting torque into the transmission, so using two helps transmit more power. In some embodiments, the system 10 is used in rail gear where an all electric propulsion propels the vehicle in a tunnel with little or no emissions.

In some embodiments, using three PTOs (e.g., one PTO on the engine and two PTOs on the transmission) enables the vehicle to provide similar torque at the output of the transmission (drive shaft, also known as prop shaft) that connects with the differential and turns the wheels, as that provided by a diesel engine. The three electric motors and three PTO interfaces are used to provide the power and total torque normally provided by one diesel engine (e.g., a Cummins 6.7 liter or Detroit DD5 engine).

In some embodiments, the PHEV system interfaces with the crankshaft through an engine interface. The engine interface includes, but does not limit to, a REPTO, a "live" PTO, and a PTO coupled to the gear part of a transmission. In some embodiments, when the engine interface is a PTO coupled to the gear part of a transmission, the vehicle needs to be put into neutral to operate the PTO when stationary, and charge batteries that supply export power similar in characteristics to the grid power. For example, the grid power may be 110-120 VAC at 60 Hz (or other frequency), or may be at European level 130 VAC, 50 Hz. The grid power may be 3 phase power. In some embodiments, the grid power may be at over 400 VAC that is enough to power a large refrigeration unit for a truck and/or trailer. In some embodiments, the power is directly supplied to a truck or trailer mounted refrigeration unit.

In some embodiments, refrigeration units are designed to operate using one of two sources of power, either a diesel engine or grid power. In some embodiments, when the grid power fails, the engine automatically turns on as a backup.

In some embodiments, the hybrid drive system described in present application mimics the grid input to the refrigeration unit, allowing the vehicle or trailer mounted refrigeration unit to operate electrically with little or no fueled engine power. In some embodiments, when the hybrid system fails, the combustion powered engine turns on to power the refrigeration unit when the vehicle is in operation (e.g., as during deliveries). In some embodiments, when the normally operated units are plugged back in, power is recharged in the hybrid battery (optionally used for propulsion, and used for power for the refrigeration unit during delivery) and optionally power to the refrigeration unit is continued when the vehicle or trailer is at stationary. In this way, the hybrid drive system or ePTO system increases fuel efficiency through hybrid or all-electric modes of propulsion, while also keeping the refrigeration unit engine off.

It is advantageous to keep the refrigeration engine off during deliveries, and optionally during travel, because diesel refrigeration engines can be high emitters of pollutants and can create loud noise, which is a big disadvantage when a refrigerated truck or refrigerated trailer is used in urban or suburban areas for delivery. For example, in Europe, due to zoning law differences, a supermarket may be located next to a residence; early morning delivery of refrigerated goods can cause disruption and may violate noise ordinances in the community. The hybrid drive system as described can keep the loud refrigeration unit off to eliminate noises. In some markets, such as London, England, diesel engines used for refrigeration may not meet current emissions standards, electrifying their operation may avoid high cost of replacement or retro-fit.

It is also important to note that the arrangement of the hybrid drive system components, as shown, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited herein. Further, the discussions related to optional sensors, lubrication paths, coupling, shafts, clutches and clutch shift PTOs apply to other embodiments described with respect to other Figures and shown in the applications incorporated herein by reference. For example, although an APU 80 and optional clutches are shown in various embodiments, they can be removed from the system without departing from the scope of the invention unless specifically recited in the claims. Accordingly, all such modifications are intended to be included within the scope of the present disclosure as described herein. The order or sequence of any process or method steps may be varied or re-sequenced according to alternative embodiments. Other substitutions, modifications, changes, and/or omissions may be made in the design, operating conditions and arrangement of the preferred and other exemplary embodiments without departing from the exemplary embodiments of the present disclosure as expressed herein.

What is claimed is:

1. A vehicle drive system for a vehicle, comprising:
- a first prime mover;
- a transmission powered by the first prime mover configured to rotate a drive shaft of the vehicle;
- a power take-off (PTO) connected to the transmission at a first interface, the PTO comprising the first interface and a second interface;
- a lubrication system comprising a pump coupled to the PTO; and
- a control system configured to control the pump to cause fluid flow through the lubrication system when the transmission is operated and the PTO is operated, wherein the PTO is configured to receive power through the first interface and transfer power to the second interface,
- wherein the control system is configured to generate a control signal causing lubricant to flow through the PTO via the pump when in a one mode, wherein the one mode is when the first interface is stationary and the second interface is moving.

2. The system of claim 1, further comprising one or more pressure sensors configured to measure a pressure within the lubrication system.

3. The system of claim 2, further comprising one or more temperature sensors configured to measure a temperature within the PTO.

4. The system of claim 3, wherein the control system provides the control signal based at least in part on at least one of the measured pressure and the measured temperature.

5. The system of claim 4, wherein the pump is configured to direct the lubricant from a suction line at a reservoir of the transmission into the PTO in the one mode.

6. The system of claim 5, further comprising:
- a valve configured to select a first path including the pump for the lubricant for the one mode and second path not including the pump when not in the one mode.

7. The system of claim 5 wherein the control system is configured to determine whether to rotate the first prime mover or start the pump to direct the lubricant based at least in part on at least one of the measured pressure or the measured temperature.

8. A lubrication system for a hybrid vehicle, the lubrication system comprising:
- a transmission fluid reservoir associated with a transmission powered by a first prime mover of the vehicle;
- a pump in fluid communication with the transmission fluid reservoir;
- a lubrication circuit coupled to the transmission fluid reservoir and a power take-off (PTO) connected to the transmission, wherein the vehicle is capable of operating in at least one mode where lubrication of the PTO is not supplied by rotation of the transmission; and
- a control system configured to generate a control signal causing lubricant to flow through the PTO via the pump when in the one mode, wherein the PTO is configured to receive power through a first section coupled to the transmission and transfer power to one or more device or accessories through a second section,
- wherein the one mode is when the first section is stationary and the second section is moving.

9. The system of claim 8, further comprising one or more pressure sensors configured to measure a pressure within one or more lubricant passages of the lubrication circuit.

10. The system of claim 9, further comprising one or more temperature sensors configured to measure a temperature within the PTO.

11. The system of claim 10, wherein the control signal is generated based at least in part on at least one of the measured pressure and the measured temperature.

12. The system of claim 11, wherein the pump configured to direct the lubricant into the PTO via the one or more lubricant passages of the lubrication circuit.

13. The system of claim 12, wherein the lubricant is transmission fluid and directed from the transmission fluid reservoir to the PTO.

14. The system of claim 13, wherein the control system is configured to determine whether to rotate the transmission or start the pump to direct the lubricant based at least in part on at least one of the measured pressure or the measured temperature.

15. A lubrication system for a hybrid vehicle, the lubrication system comprising:

one or more sensors configured to measure a pressure and temperature;

a transmission fluid reservoir associated with a transmission powered by a first prime mover of the vehicle;

a pump in fluid communication with the transmission fluid reservoir;

a lubrication circuit coupled to the transmission fluid reservoir and a power take-off (PTO) connected to the transmission, wherein the vehicle is capable of operating in at least one mode where lubrication of the PTO is not supplied by rotation of the transmission; and a control system configured to generate a control signal causing lubricant to flow through the PTO via the pump when in the one mode, wherein the lubricant is transmission fluid and directed from the transmission fluid reservoir to the PTO, wherein the control system is configured to determine whether to rotate the transmission or start the pump to direct the lubricant based at least in part on at least one of the pressure or the temperature.

16. The system of claim 15, wherein the PTO receives power through first interface coupled to the transmission, and transfers power to a second interface.

17. A method of lubricating and cooling a power take-off (PTO) of an engine performed by an electronic control system, the method comprising:

determining, a lubricating and cooling condition of the PTO, wherein the PTO is configured to receive power through an input section coupled to a transmission and transfer power to one or more devices or accessories through an output section;

rotating a prime mover to drive the transmission coupled to the input section in response to the lubricating and cooling condition of the PTO; and pumping lubricant via a pump to direct the lubricant into the PTO in response to the lubricating and cooling condition of the PTO in a mode when the input section is stationary and the output section is moving.

18. The method of claim 17, wherein determining the lubricating and cooling condition comprises determining at least one of a temperature within the PTO or a pressure of a lubricant flow connected to the PTO.

19. The method of claim 17, wherein the pump is hydraulically coupled to the PTO.

20. The method of claim 17, wherein the pump is connected to a transmission fluid reservoir and configured to direct the lubricant from the transmission fluid reservoir into the PTO.

* * * * *